(12) United States Patent
Lee

(10) Patent No.: US 11,546,300 B2
(45) Date of Patent: Jan. 3, 2023

(54) FIREWALL SYSTEM WITH APPLICATION IDENTIFIER BASED RULES

(71) Applicant: Comcast Cable Communications, LLC, Philadelphia, PA (US)

(72) Inventor: Yiu Leung Lee, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 706 days.

(21) Appl. No.: 16/404,924

(22) Filed: May 7, 2019

(65) Prior Publication Data

US 2020/0358744 A1 Nov. 12, 2020

(51) Int. Cl.
*H04L 9/40* (2022.01)
(52) U.S. Cl.
CPC ...... *H04L 63/0263* (2013.01); *H04L 63/0236* (2013.01)
(58) Field of Classification Search
None
See application file for complete search history.

(56) References Cited

U.S. PATENT DOCUMENTS

| | | | | |
|---|---|---|---|---|
| 9,215,214 B2 * | 12/2015 | Bansal | ............ | H04L 63/20 |
| 9,237,130 B2 * | 1/2016 | Ji | ............ | H04L 63/0245 |
| 10,484,334 B1 * | 11/2019 | Lee | ............ | H04L 63/0245 |
| 2004/0268149 A1 * | 12/2004 | Aaron | ............ | H04L 63/08 726/11 |
| 2007/0294756 A1 * | 12/2007 | Fetik | ............ | H04L 63/0209 726/11 |
| 2009/0241170 A1 * | 9/2009 | Kumar | ............ | H04L 63/102 726/3 |
| 2018/0034858 A1 * | 2/2018 | Gummaraju | ............ | H04L 63/0876 |
| 2018/0191683 A1 * | 7/2018 | Wighe | ............ | H04L 63/0263 |
| 2019/0081983 A1 * | 3/2019 | Teal | ............ | H04L 63/0227 |
| 2019/0245830 A1 * | 8/2019 | Ratnasingham | ............ | H04L 63/20 |
| 2019/0260677 A1 * | 8/2019 | Zheng | ............ | H04L 45/38 |

* cited by examiner

*Primary Examiner* — Christopher C Harris
(74) *Attorney, Agent, or Firm* — Banner & Witcoff, Ltd.

(57) ABSTRACT

A firewall service for a cloud computing environment is described that uses an application identifier-based ruleset to process data packets. An application identifier-based rule may provide an action to be taken on a received packet based on the source application identifier, the destination application identifier, and/or an identification token associated with the source application. A firewall controller may verify applications of the computing environment, provide unique application identifiers, and manage the application identifier rules for one or more firewalls of the computing environments.

19 Claims, 8 Drawing Sheets

FIREWALL SYSTEM WITH APPLICATION IDENTIFIER BASED RULES

BACKGROUND

Firewall devices typically determine which packets are permitted through the firewall based on one or more rules. Firewall rules typically use physical network locations, such as source and destination Internet Protocol (IP) addresses, or source and destination port numbers, to determine whether to block or allow network traffic. In virtualized environments, however, applications are no longer static and can be launched in any location based on available resources. For example, an application running on virtual machines or containers can be launched anywhere within the virtual environment purely based on demand and capacity. This type of application deployment model complicates location-based firewall efforts. These and other shortcomings are identified and addressed by the disclosure.

SUMMARY

The following summary presents a simplified summary of certain features. The summary is not an extensive overview and is not intended to identify key or critical elements.

Systems, apparatuses, and methods are described for a firewall service, of a cloud computing environment, that uses an application identifier-based ruleset, instead of rules based solely on network location identifiers (such as IP addresses, devices addresses and/or port numbers). To process received packets, the firewall service may obtain, from the received packets, a source application identifier and a destination application identifier. The source application identifier may have been uniquely assigned to the application that is sending the packet, and the destination application identifier destination application identifier may have been uniquely assigned to an application that is to receive the packet. An application identifier rule may provide an action to be taken on a received packet based on the source application identifier and the destination application identifier. A firewall controller may verify applications of the environment, provide unique application identifiers, and manage the application identifier rules for one or more firewalls of the computing environments.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
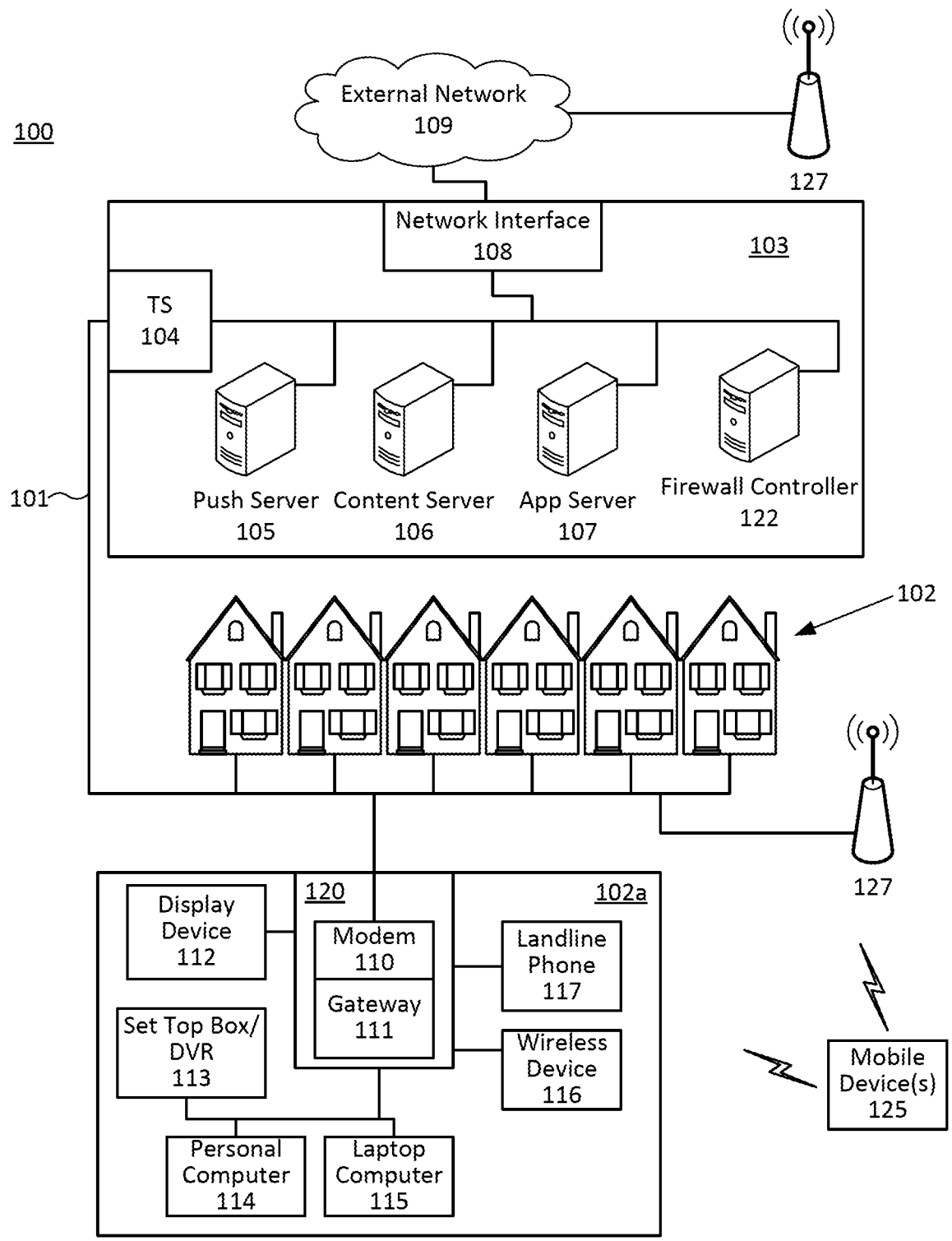
FIG. 1 shows an example communication network.

The accompanying drawings, which form a part hereof, show examples of the disclosure.

It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured manage communications among those devices, to manage communications between those devices and back-end devices such as servers 105-107 and firewall controller 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional computing devices, such as the firewall controller 122 (described below), additional push, content, and/or application servers, and/or other types of devices. Although shown separately, the push server 105, the content server 106, the application server 107, the firewall controller 122, and/or other server(s) may be combined. The servers 105, 106, 107, and firewall controller 122, and/or other computing devices, may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
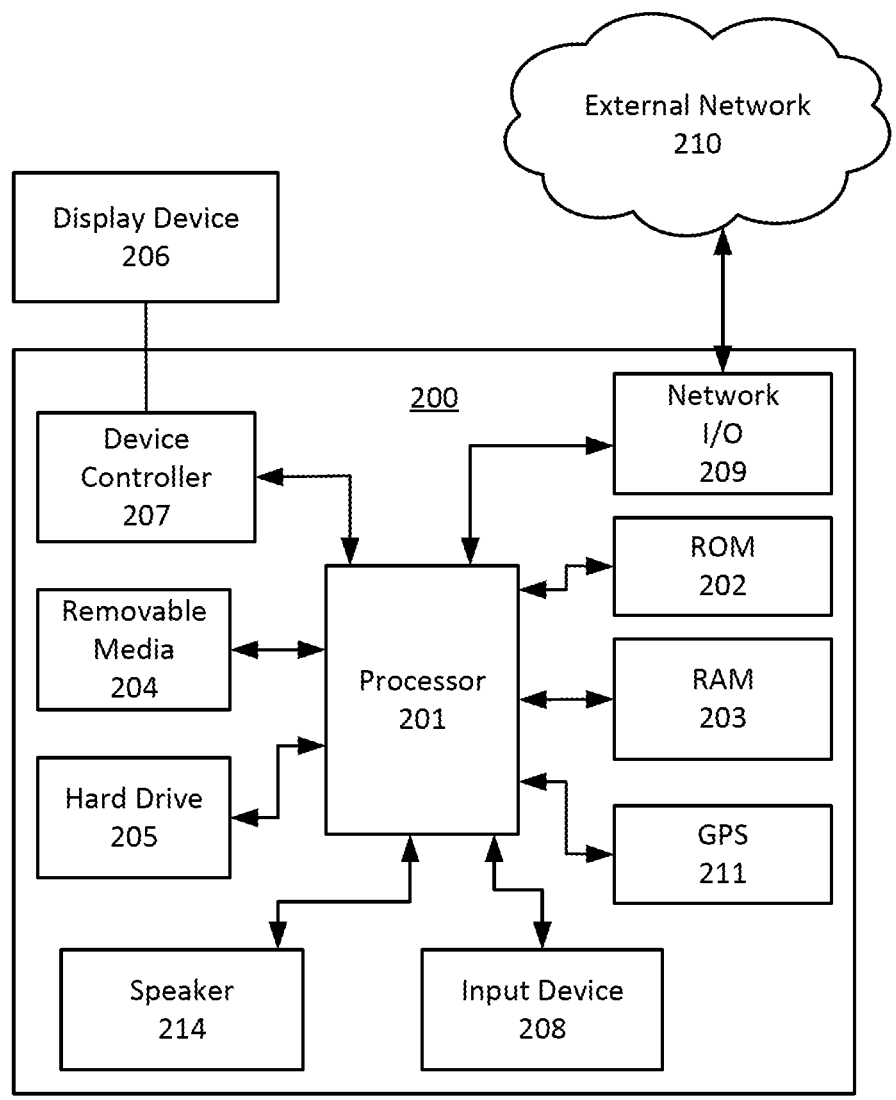
FIG. 2 shows hardware elements of a computing device.

FIG. 2 shows hardware elements of a computing device 200 that may be used to implement any of the computing devices described herein (e.g., the mobile devices 125, any of the devices shown in the premises 102a, any of the devices shown in the local office 103, any of the wireless access points 127, any devices with the external network 109) and any other computing devices discussed herein (e.g., firewalls, servers hosting deployed applications, and/or firewall controller 122). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The communication device 200 may comprise a location-detecting device, such as a global positioning system (GPS) microprocessor 211, which may be configured to receive and process global positioning signals and determine, with possible assistance from an external server and antenna, a geographic position of the communication device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
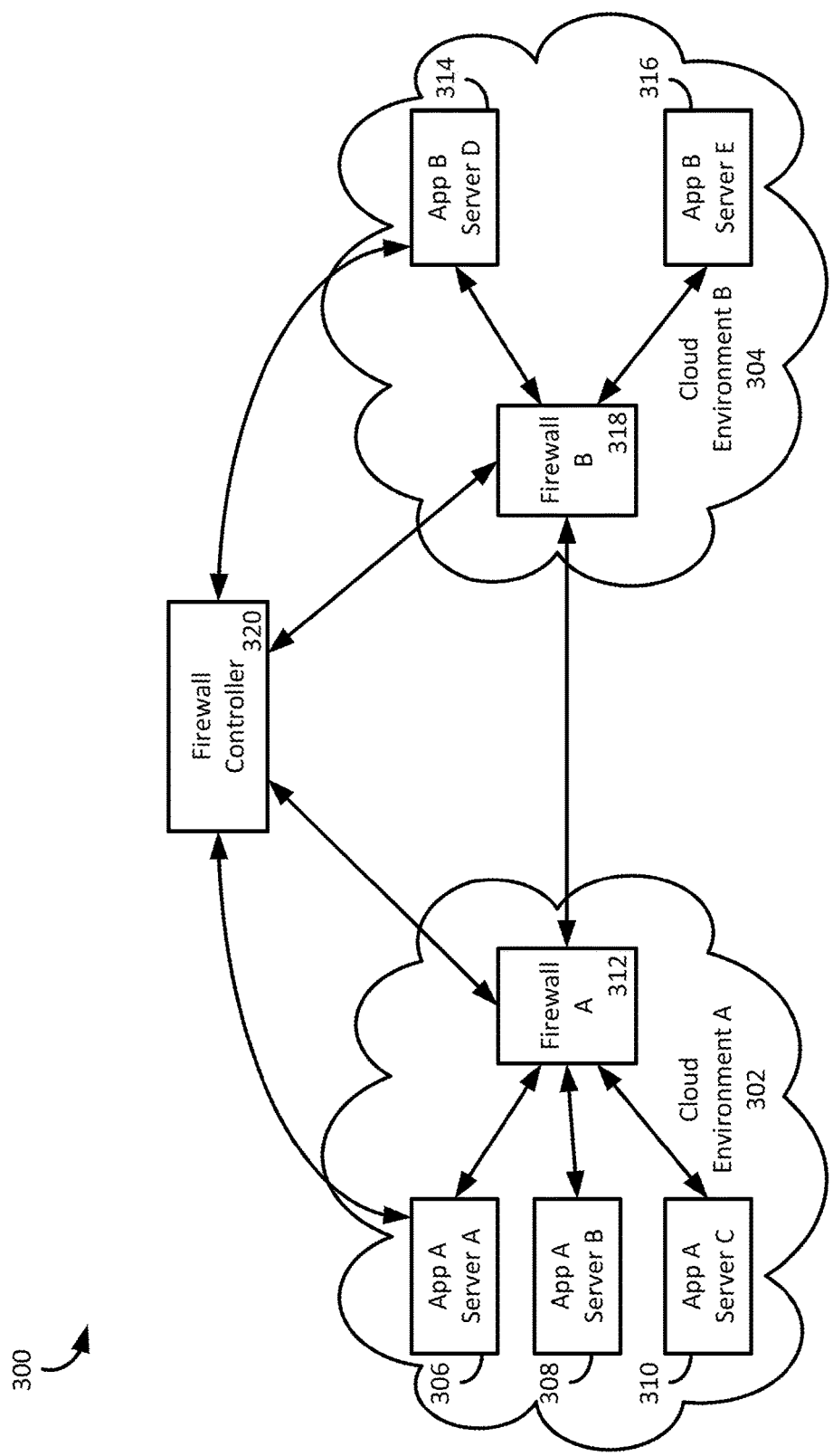
FIG. 3 shows an example network environment using role-based firewalls and a firewall controller to provide firewall protection to cloud environments.

The components described herein may be instantiated in one or more cloud computing environments as applications that share resources of the cloud environments. For example, FIG. 3 shows an example network environment 300 in which one or more components or systems discussed above may be instantiated. Although described herein as a cloud computing network, the network environments 302, 304 (e.g., cloud computing environments) may comprise any shared or standalone networks, such as cloud computing networks, data centers, office networks, home networks, etc. In FIG. 3, the network environment 300 may comprise one or more network environments 302, 304 that communicate or share data between applications. Generally, cloud computing may be a network-based computing environment in which computing resources are shared among the applications instantiated or otherwise hosted in the cloud environment. Cloud computing environments may be public (or external to a company using the cloud service), private (or internal to a company using the cloud service), or a combination of both public and private. Cloud computing resources may comprise, for example, servers, storage devices, virtualization components, network components, and the like. Application software for the management, automation, and/or orchestration of pools of computing components may be instantiated in the cloud computing environment to facilitate the execution of one or more applications hosted by the environment. Pooled computing resources and components may be provided, for example, as a service that manages the execution and implementation of one or more applications hosted in the cloud computing environment.

Applications instantiated in a cloud environment may communicate with other applications in the same or in other cloud environments. The communications may be delivered via a network that may be, without limitation, the Internet, an intranet, an Ethernet network, a wired network, a wireless network, or the like, is used by one or more computing devices or resources of the cloud environment. The network 302 may comprise any number and type of computing devices for executing workloads or applications on the network. One or more of the computing devices (such as Server A 306) connected to the network 302 may utilize the components or resources of the environment to execute an application (such as application A) or a workload request. The components of the network 302 may be shared among many computing devices that intercommunicate to execute a portion of the component or an application. The network 302 (and the computing devices of the network) may also have access to one or more storage devices that aid the computing devices in executing a program or application. The storage devices may be integrated in the network, or may be accessible through any number of other networks. Executing applications may be virtualized when deployed within the network to provide flexibility in the instantiation and execution of the applications.

Communication to and from the network 302 may use one or more firewall devices (also referred to as firewall services), such as firewall A 312 of network 302. Firewalls 312 determine which packets are permitted through the firewall and into or out of the network 302 based on one or more rules. For example, firewall A 312 may deny packets, received at network 302, that originate from a particular device identified by an IP address. The firewall A 312 may also deny packets egressing from the network 302 to other networks (such as network 304) or to other components in communication with the network, such as firewall B 318 and/or application B on server D 314. The packets that are allowed or denied are based on one or more rules maintained by the firewall device 312. For example, firewall A 312 may store a rule base that is examined for all received packets to determine if the packet is allowed or denied into or from the network 302. Firewall B 318 may operate in a similar manner for network B 304.

To communicate with other networks/devices, server A 306, server B 308, and server C 310 may transmit and receive communication packets (e.g., data packets) via firewall A 312. Server A 306, server B 308, and server C 310 may be server devices instantiated within network A 302, either virtually or physically, such that communications between server A 306, server B 308, and server C 310 may occur via firewall A 312. In network B 304, server D 314 and server E 316 may transmit and receive communication packets via firewall B 318. Transmission of communication packets between the devices of network A 302 may occur over transmission lines and other networking components of network A. Transmission of communication packets between the devices of network B 304 may occur over transmission lines and other networking components of network B.

Communication packets may also be transmitted between network A 302 and network B 304, as illustrated by the arrow connecting firewall A 312 and firewall B 318. Through the firewalls 312, 318, the networks 302, 304 may transmit and receive communications between the networks. The firewalls 312, 318 may manage the transmission of the communication packets through the application of the firewall rules.

Although only three servers 306-310 are illustrated in network A 302 of FIG. 3, any number of physical or virtual components may be included in the environment. The network A 302 provides for communications between any number of the components of the environment, including between the components and firewall A 312. Any number of physical or virtual components may also be included in network B 304, with interconnection between the components and firewall B 318. The servers 306-310 of network A 302 are shown as hosting instances of a first application (Application A), although the servers may host any number of applications on a shared or dedicated server and the application instances may be shared across multiple computing devices of the environment. The servers 314-316 of network B 304 are shown as hosting instances of a second application (Application B), although the servers may host any number of applications on a shared or dedicated server and the application instances may be shared across multiple computing devices of the environment. Firewall A 312 of the network A 302 and firewall B 318 of network B 304 may be instantiated on one or more computing devices of the respective cloud environments. For example, an application server of network A 302 may be configured to perform the functions of a firewall device to form firewall A 312.

One or more of the components, applications, or devices of the networks 302, 304 may communicate with a firewall controller 320. For example, firewall A 312 and firewall B 318 may communicate with the firewall controller 320. The firewall controller 320 may configure aspects of firewall A 312 and/or firewall B 318, as described in more detail below. In one example, the firewall controller 320 may provide one or more firewall rules to the firewalls 312, 318 to be included in the firewall ruleset for each device. Other communications between the devices of the networks 302, 304 and the firewall controller 320 are discussed in more detail below with reference to FIGS. 4-5.

Firewall A 312 of network A 302 and firewall B 318 of network B 304 operate to control the flow of data packets into and out of the respective cloud environments. For example, server A 306 of network A 302 may communicate with server D 314 of network B 304 to perform some function or software operation. Server A 306 may execute a first application (application A) to perform the function of a web server and server D 314 may execute a second application (application B) to perform the function of a database. During operation of application A, access to the database of application B may be used to store information at the database. The transfer of packets to and from application A on server A 306 to and from application B on server D 314 may pass through firewall A 312 and firewall B 318. For example, firewall device A 312 may determine, through the use of one or more firewall rules, if the packets intended for server D 314 are allowed to pass through the firewall. If allowed, the packets are transmitted to firewall B 318 that also determines if the data packet is allowed to be transmitted to server D 314 through stored transmission rulesets. Communication packets from server D 314 back to server A 306 may follow a similar path through firewall B 318 and firewall A 312. The firewall rules thus determine which packets are allowed to be transmitted through the firewalls and which packets are stopped or dropped by the firewalls.

Figure 4:
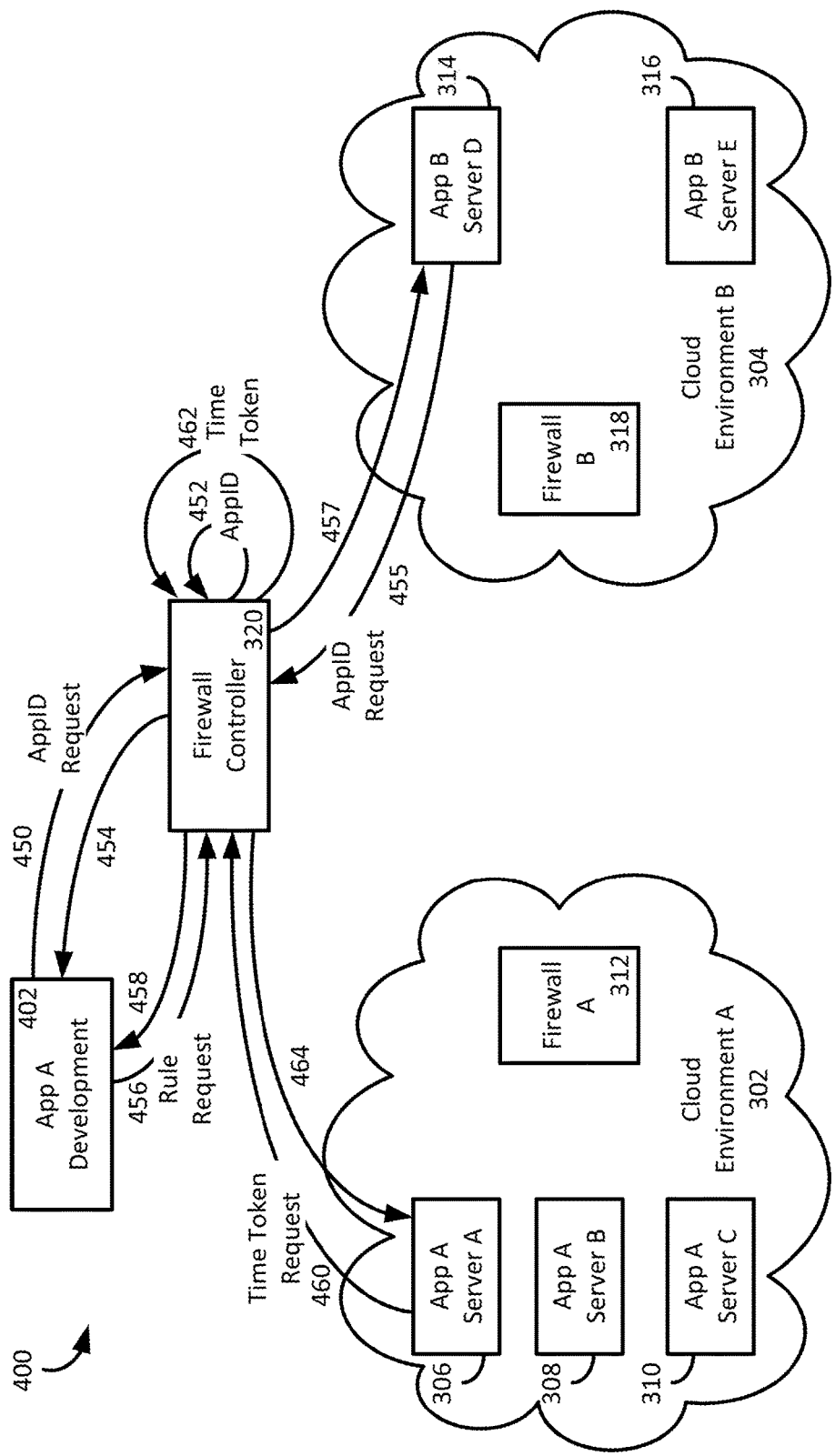
FIG. 4 shows an example method for providing an application identifier to an application deployed in a cloud environment.
Figure 5:
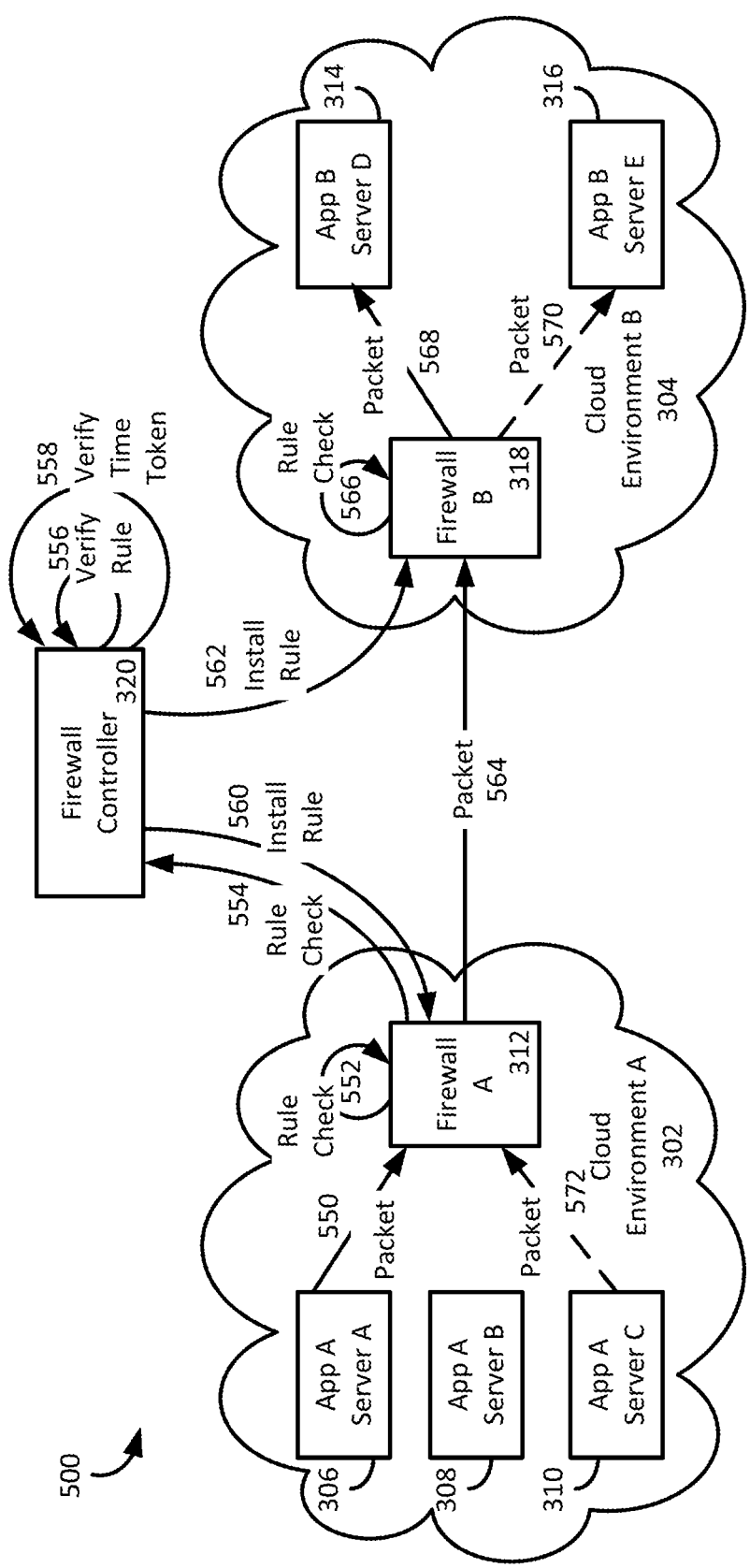
FIG. 5 shows an example method for using application identifier rules in a firewall device of a cloud environment.

FIGS. 4 and 5 show an example method for using application identifier rulesets in a firewall device of a cloud environment. The rulesets for a firewall device or application of a cloud environment, such as firewall A 312 of network A 302, may use one or more application identifiers to determine an action to take on a received packet. For example, firewall A 312 may comprise a rule that allows communication packets from a server 306 hosting application A of network A 302 to be transmitted to a server 314 hosting application B of network B 304 based on an application A identifier and an application B identifier, instead of the physical location identifier (IP address or port number) of the hosting servers. As application A may be deployed on several devices within the network 302, a rule based on application identifiers does not need to be updated when the application is switched from one device of the network 302 to another, reducing the workload to maintain the ruleset of the firewall 312. Failover or load sharing of the virtual application A may also occur faster within the network 302 as the ruleset within the firewalls 312, 318 does not need to be updated for each re-deployment of the application. Rulesets may also be dynamically generated and distributed by the firewall controller 320 to several firewalls 312, 318 of several networks 302, 304 for faster implementation of rulesets for deployed applications.

FIG. 4 shows an example system 400 and method for providing an application identifier to an application for deployment in a cloud environment. To generate an application identifier rule for the firewall 312 of the network 302, an application to be deployed in the cloud environment on one or more computing devices may receive a unique application identifier. For example, application A may be a web server application for a company. Application A may be any software with a function that may be deployed in the network 302 (e.g., a virtual cloud-based environment). During development 402 of application A, the application may communicate with the firewall controller 320 of the system 400 to request and receive a unique application identifier associated with the application. For example, communication 450 may be transmitted from the application A 402 to the firewall controller 320 to request a unique application identifier. The request for the unique application identifier may occur separate from the network 302 or within the cloud environment. For example, application A may be developed 402 within the network 302 using services and/or devices of the cloud environment such that the request for the application identifier is transmitted from the network 302. The firewall controller 320 may also be instantiated within the network 302 such that the request for the application identifier occurs within the cloud environment. Alternatively, the firewall controller 320 may be included as part of a firewall, such as the firewall 312 or the firewall 318.

Application A may transmit a unique value (such as a universally unique identifier (UUID)) to the firewall controller 320 to request an application identifier. The UUID may be a 128-bit number that is unique to the application. Multiple instances of the same application, such as application A of server B 308 and application A of server C 310, may share the unique application value provided for the application. Different versions of the same application, such as version 1 of application A and version 2 of application A, may use the same UUID or different UUIDs when receiving an application identifier. The firewall controller 320, at 452, may register the UUID sent from the application 402 and generate an application identifier or digital certificate for the application based on the provided UUID. As the UUID is unique as assigned to the application, the application identifier generated by the firewall controller 320 from the UUID is also unique to the application. The generated application identifier may be stored by the firewall controller 320 and associated with the provided UUID. The firewall controller 320 sends, at 454, the generated application identifier to the application during the application development 402 and the application stores the application identifier for use in transmitting communication packets.

The application 402 may also request permission, at 456, for one or more firewall rules to be implemented within one or more firewalls within the system 400. For example, it may be known that the web server of application A may store information in a database. The database for the web server application may be implemented through application B and deployed in a device 314 of a separate cloud environment, such as network B 304. As data from application A is to be stored in the database of application B, communication packets from application A to application B may be sent. Acknowledgment messages or data packets from read requests may also be sent from application B to application A. To facilitate sending packets between the applications, application A 402 may request firewall A 312 and firewall B 318 include a ruleset that allows for the transmission of such packets. For example, application A 402 may request implementation of a rule that allows packets from source application identifier A to destination application identifier B to be maintained in firewall A 312 and firewall B 318. Such a rule may take the form of:

| Requested Rule | | |
|---|---|---|
| Source Application ID | Destination Application ID | Action |
| Application A ID | Application B ID | Allow |

The rule implementation request from application A 402 may comprise the application A identifier (as a source of packets for the rule) and an application B identifier (as a destination of packets for the rule). In some embodiments, the source application ID and the destination application ID may contain an identical value (i.e., same application ID) in a firewall rule, as in the case where application A deployed in one cloud environment is permitted to exchange data packets with application A deployed in another cloud environment. In some embodiments, a firewall rule may include only the source application ID (without a destination application ID) and its associated action. For example, a firewall rule that allows packets from source application A would allow packets from application A to pass through regardless of what the destination application ID in a packet is. Similarly, a firewall rule may include only the destination application ID (without a source application ID) and its associated action. For example, a firewall rule that disallows packets with destination application B would block any packets that were sent to application B regardless of which application sent those packets.

Firewall controller 320 may accept or deny the rule implementation request from application A 402. Requesting implementation of a rule for communicating with a particular application may provide the firewall controller 320 or firewall controller administrator control over the rulesets instantiated in the firewalls of the system 400. For example, the firewall controller 320 may deny a rule implementation request for policy reasons, such as a relative security level intended for the applications, devices, or cloud environments of the system. A higher security policy for the network 302 may result in fewer rules being allowed by the firewall controller and a lower security policy for a cloud environment may result in more rules being allowed. Other policies may also be implemented through the rule implementation requests. For example, the firewall controller 320 may deny rules for particular applications that are deemed to be against the security policy for the system 400, such as malware applications or other nefarious applications. A security policy for the firewall controller 320 may also limit the number of applications that a particular application may communicate with through the firewalls 312, 318. For example, the security policy may allow application A to exchange communications with application B, but deny any rules for exchanging communications with other applications. Through the firewall controller 320, a security policy for the system 400, one or more networks 302, 304, and/or applications deployed within the cloud environments may be controlled.

Other applications of the networks 302, 304 may also register with the firewall controller 320 to receive an application identifier for use in firewall rulesets. For example, application B 314 may also send an application identifier request 455, comprising a UUID of application B, to the firewall controller for a unique application identifier. The firewall controller 320 may return, at 457, an application identifier unique to application B that may be used in an application identifier firewall ruleset. The firewall controller 320 may also deny a rule implementation request from application A until a requested application, such as application B, registers with the controller and receives an application identifier, at which time the requested ruleset may be allowed based on the security policy implemented through the firewall controller. The firewall controller 320 may notify, at 458, application A 402 the results of the rule implementation request, such as if the requested firewall rule is allowed or denied. Further development of application A may continue in response to the notification from the firewall controller 320 of the rule implementation request.

Application A may be deployed in a cloud environment, such as network A 302. For example, application A may be deployed as a virtual machine on a physical device, such as server A 306, or as a physical server of the cloud environment. Regardless of the type of deployment, application A may receive an IP address or other network location identifier associated with the physical device of the network 302 in which the application is deployed. Multiple instances of application A may also be instantiated or deployed within the network 302. For example, a second instance of application A may be deployed on server B 308 of network A 302 and a third instance of application A may be deployed on server C 310 of cloud environment A. Server B 308 and server C 310 may have IP addresses or other network location identifiers associated with the respective servers. The instance of application A on server B 308 may thus be associated with the IP address of server B and the instance of application A on server C 310 may be associated with the IP address of server C. Instances of application B may also be deployed in server D 314 and server E 316 of network B 304. The instances of application B may also be associated with the IP address of server D 314 and server E 316, respectively.

The deployed application A instance of server A 306 may request, at 460, a token from firewall controller 320. In the token request, application A may provide the unique application identifier obtained from the firewall controller 320 above (steps 450-454) and the IP address or other network location identifier of the server (server A 306) on which the application is deployed. The token for the application may be used as a second-level verification of the application for transmission of data or communication packets through firewalls 312, 318 of networks 302, 304. The token may comprise an expiration feature such that the token is valid during a time period, after which the token is invalid for identification of the application. Older tokens associated with an application may thus be expired and a new token may be requested for the second-level verification of the application. The expiration feature of the token prevents a stolen token from being used after the expiration of the token to fraudulently use the firewalls 312, 318 of the networks 302, 304. Other applications of the networks 302, 304 may also request an identification token from the firewall controller 320. For example, application B 314 may also send a token request comprising an application identifier and the IP address of the device upon which the application B is deployed to the firewall controller for a destination token. The firewall controller 320 may return an identification token to application B that may be used in an application identifier firewall ruleset.

The token provides the second-level verification against a stolen application identifier of an application. For example, the application identifier provides an identification of the application to other devices within the network 302 that often may not change during the life of the application. If the application identification for application A is somehow compromised or stolen, a fraudulent user may pose as application A from a different location and transmit packets through the associated firewall 312. As the ruleset of firewall 312 is application identifier-based, packets from the fraudulent application would be allowed to pass through the firewall. The token, therefore, provides an additional level of identification and security of application A deployed into the network 302 by using the network location identifier of the device (server A 306) upon which the application is deployed but without using the location identifier in the ruleset of the firewall. The token includes the expiration feature to prevent against usage of the token by a fraudulent entity after expiration of the token.

The firewall controller 320 may generate, at 462, the requested token. The token may be a repeatable hash value generated from the IP address or network location identifier provided by the application. For example, application A of server A 306 may provide the unique application identifier received from the firewall controller and the IP address of server A 306 to request a token. The firewall controller 320 may calculate a hash value from the IP address using a hashing function and set the hash value as the token. The firewall controller 320 may also associate and store the token hash value, the application identifier provided by the application, an expiration date of the token, an IP address of the device on which the application is deployed, and/or a device identifier of the IP address. The firewall controller 320 may store all associated application identifiers and tokens in an application map for use during sending of packets between applications, including the expiration of each of the stored time tokens. Within the application map, each application identifier may be associated with an IP address associated with the device on which each instance of an application is deployed in the cloud environment and the generated token for each instance of an application. For example, Table 1 illustrates an example application map for the system 400 of FIG. 4.

ated with the IP address (2.1.1.1) for server D 314 and the IP address (2.1.1.2) for server E 316 on which an instance of application B is deployed in network B 304. An associated token (illustrated as token 0004 for application B on server D 314 and token 0005 for application B on server E 316) is also included in the application map. The application map may be used, as explained more below, to verify the identity of an application requesting to send packets through a firewall.

The IP address for the source device and/or the device identifier of the source device may not, in some instances, be stored in the application map. The IP address of the source device and/or the device identifier may be derived from the associated token. For example, the firewall controller 320 may generate the source IP address from the identification token using the same hashing function as described above. The source IP address and/or the device identifier of the source device may thus be derived from the received identification token such that the values may be omitted from the application map maintained by the firewall controller 320.

The generated token may be provided, at 464, or sent to the application that requested the token, such as application A of server A 306. Application A may store the received token for use in transmitting communication packets to applications, devices, or cloud environments through firewall 312.

With an application identifier and a token, an application may attempt to communicate with other applications. Continuing the above example, application A of server A 306 of network A 302 may, during the execution of application A, communicate with application B of server D 314 of network B 304. Such communications may be transmitted through firewall A 312 and firewall B 318 as controlled by the firewall controller 320 and based on application identifier rulesets stored by the firewalls. FIG. 5 shows an example method for using application identifier rules in a firewall device of a cloud environment. The devices and cloud environments of the system 500 of FIG. 5 are the same or similar to the devices and environments discussed above with relation to FIGS. 3-4.

TABLE 1

| Hash Value of Token of Deployed Applications | Expiration Date of Token | Unique Identifier of Application Associated with Token | IP Address of Device On Which Application is Deployed | Device Identifier Associated with IP Address |
| --- | --- | --- | --- | --- |
| eac2efa | 12/12/18 21:00:53 | Application A | 1.1.1.1 | Server A of Cloud A |
| da9466d | 12/24/18 03:34:27 | Application B | 2.1.1.1 | Server A of Cloud B |
| fb27ed6 | 01/04/19 05:13:21 | Application A | 1.1.1.3 | Server C of Cloud A |
| 9cb68f8 | 01/05/19 14:47:01 | ApplicationA | 1.1.1.2 | Server B of Cloud A |
| 16b054a8 | 01/07/19 11:32:51 | Application B | 2.1.1.2 | Server B of Cloud B |

As shown, the application map may associate an application identifier with the device on which each instance of an application is deployed in the cloud environment and the generated token for each instance of an application. Application identifier for application A is associated with the IP address (1.1.1.1) for server A 306, the IP address (1.1.1.2) for server B 308, and the IP address (1.1.1.3) for server C 310 on which an instance of application A is deployed in network A 302. An associated token (illustrated as token 0001 for application A on server A 306, token 0002 for application A on server B 308, and token 0003 for application A on server C 310) is also included in the application map. The application identifier for application B is associ- To communicate with another application or device, application A of server A 306 may initiate a communication session with the destination application or device. In one example, the application may begin by establishing a transmission control protocol (TCP) connection with the destination application. Although discussed herein as a TCP connection, any communication protocol may be used by application A to communicate with another application or device. In the TCP protocol, initiation of a connection between applications may comprise a sending application transmitting a synchronize message (tcp-syn packet) to the destination application, to which the destination application transmits a synchronize acknowledgement message (syn-ack packet). The sending application may then transmit an acknowledgement message (ack packet) and the communication session is established. Thus, to initiate the session with application B of server D 314, application A 306 of server A 306 may transmit, at 550, a tcp-syn packet to firewall A 312 for transmission to application B.

The initial packet 550 from application A may comprise information used by firewall A 312 (and other networking devices) to transmit the packet through the networks to the destination. For example, the initial packet 550 may comprise a source IP address of server A 306, a destination IP address of server D 314, a source port number, a destination port number, etc. This information may be included in the header of the initial packet 550. Additional information may also be included in the initial packet, such as the application identifier and token for application A obtained above from the firewall controller and an application identifier of the destination application (application identifier for application B). The source application identifier, destination application identifier, and token may be included in a cookie field of the header of the packet or any other configurable portion of the header of a communication packet.

Firewall A 312 of network A 302 may extract or otherwise determine the source application identifier, destination application identifier, and token included in the initial packet from application A. As mentioned above, the firewall 312 may comprise an application-identifier ruleset that provides actions for transmission of packets based on application identifiers. Thus, firewall A 312 may be configured to obtain a source application identifier and a destination application identifier from a received packet. Firewall A 312 may also be configured to obtain a token from the received packet. With the received source application identifier (application A) and the destination application identifier (application B), the firewall 312 determines, at 552, if a rule of the stored ruleset provides an action to take on the received communication. If a rule is stored that provides an action, such as allow, deny, apply class-of-service marking (e.g., EF), apply encryption based on the token, mirror packet for threat analysis, etc., for the source application identifier (application A) and the destination application identifier (application B), firewall A 312 may execute the action on the received packet.

As the initial synchronization packet is near the beginning of a communication session between application A and application B, firewall A 312 may determine that an established rule is not in the stored ruleset for the firewall for transmitting such packets. If no rule is stored that provides an action on the packet based on the application identifiers, firewall A 312 may communicate, at step 554, with the firewall controller 320 to determine if a rule is to be included in the ruleset for the firewall. To check if the firewall controller 320 includes a rule corresponding to the received packet, firewall A 312 may send a rule verification request to the firewall controller. The request may include the received packet or may only include portions of the received packet, such as the source application identifier (application A), the destination application identifier (application B), the token, and/or the source IP address.

The firewall controller 320 may, at 556, verify that a rule is established or implemented for communications from the source application (application A) identified through the provided source application identifier to the destination application (application B) identified through the provided destination application identifier. For example, application A 402 may request verification and creation of a rule as described above with relation to steps 456 and 458 of FIG. 4. The firewall controller 320 may thus include a previously created rule that allows communications from application A to application B. The rule may comprise an action on transmission of such packets, such as allowing transmission of the packet, denying transmission of the packet, directing the packet to a honeypot device, and the like. If a rule is established at the firewall controller 320 based on the rule implementation request from application A above, the controller may verify, at 558, the token associated with the source application. For example, the firewall controller 320 may use the provided source IP address or application identifier to obtain the token stored in the application map and compare the stored token to the token provided in the packet. If the stored token and the provided token match, the identity of the source application (application A) is verified. If the stored token and the provided token do not match, the identity of the source application (application A) is not verified and the packet may be discarded. The firewall controller 320 and/or the firewall A 312 may also use the source IP address to generate, through the same hashing function as discussed above, a hashing value. The generated hashing value may be compared to the provided token in the packet to determine if they are the same. If the hash value matches the provided token from the packet, the identity of application A is verified.

Each token generated by the firewall controller 320 may also be associated with a lifespan value used to determine an expiration of the token. For example, tokens generated by the firewall controller 320 may be associated with a one-week lifespan. Firewall controller 320 may be configured to set the expiration of a token at any value. The remaining lifespan of a token may be determined when the token is provided as an identification of an application. For example, the token generated for application A of server A 306 may comprise a timestamp that indicates a year, month, day, hour, minute, second, etc. when the token was generated. This timestamp may be stored with the token in the application map. When the token is provided as an identifier of application A (as explained more below), the firewall controller 320 may compare a current year, month, day, hour, minute, and/or second to the stored timestamp for the token. If the difference between the current time and the stored timestamp exceeds a lifespan value for the token (such as one-hour, two-weeks, one-month, etc.), the firewall controller 320 may determine that the token has expired and any communication that accompanies the token may be discarded. The lifespan value for a token may be specific to an application such that some applications receive a shorter lifespan value than other applications. The lifespan value for the token aids the system 500 in protecting from fraudulent applications using stolen identification information. For example, a fraudulent application may obtain an old token and use the token and application identifier to appear as a verified application in the network 302. However, communication packets with expired tokens may be discarded by the firewall controller 320 or firewall A 312 to maintain the security of the tokens.

Firewall controller 320 may install, at 560, the rule associated with the source application identifier (application A) and the destination application identifier (application B). The installed rule may be the same rule requested by application A discussed above for communicating with application B. Firewall A 312 may receive the verified rule and add the rule to the ruleset maintained by the firewall. The verified rule, at 562, may also be provided to and installed at firewall B 318. The verified rule may be installed in any or all of the firewalls in communication with the firewall controller 320. For example, network A 302 may comprise several firewalls controlled by the firewall controller 320 and the verified rule may be installed in each of the firewalls of cloud environment A. The rule may also be installed in each firewall of network B 304, and in other cloud environments in communication with the firewall controller 320.

The installation of the verified rule in firewall devices in communication with the firewall controller 320 may be limited to particular firewalls. For example, the firewall controller 320 may maintain a listing of firewalls and associated applications or devices. The firewall listing may identify application A instance of server A 306, application A instance of server B 308, and application A instance of server C 310 using firewall A 312 to transmit and receive communication packets. The firewall listing may also identify application B instance of server D 314 and application B instance of server E 316 using firewall B 318 to transmit and receive communication packets. Other firewalls of the same or other cloud environments may also be included in the firewall listing and associated with registered applications. With such routing information between application A and application B, the firewall controller 320 may determine that a packet from source application A to destination application B may use firewall A 312 and firewall B 318 and install the verified rule for such transmissions in firewall A and firewall B. The firewall controller 320 may thus determine which firewalls are included in a routing path for a rule and update firewalls included in that path. This may reduce the number of changes to the rulesets of the various firewalls of the system while also reducing the number of rules included in a ruleset for a firewall.

Firewall A 312 may execute, at 564, the verified rule and transmit the initial packet to firewall B 318 (if the action of the rule is to allow the packet to be transmitted). Firewall A 312 may also verify the token of the initial packet in a similar manner as the firewall controller 320. For example, firewall A 312 may receive and use the same hashing function as used by the firewall controller 320 to determine the token from the source IP address in the communication packet and compare the provided token to the determined token from the IP packet. In another example, firewall A 312 may receive the application map from the firewall controller 320 and store the application map for comparison of a received token of a communication packet to an entry in the application map. Updates to the application map as applications register with the firewall controller 320 may also be provided such that firewall A 312 may compare received packets from newly deployed applications in the network 302. Firewall A 312 may verify the token of a received packet for initial requests for a communication session or flow (such as the packets used to establish a TCP connection) or for all received packets for transmission through the firewall. Firewall B 318 may similarly verify tokens of received packets or may ignore tokens once a communication session is established between two applications.

Firewall B 318 may receive, at 566, the packet and obtain the source application identifier (application A) and the destination identifier (application B) and consult the stored ruleset to determine if a rule exists in the ruleset for the packet. The installed verified rule of firewall B 318 may allow, at 568, transmission of the packet to application B of server D 314. The rule used to allow the packet to be transmitted to application B may use the application identifiers of the source application and the destination application.

The syn-ack packet (or other type of acknowledgement message) from application B may traverse the same transmission path in the opposite direction through firewall B 318 and firewall A 312 to application A. Firewall B 318 and firewall A 312 may again consult the respective stored ruleset to determine if a rule is stored that allows transmission of packets from application B to application A. The verified rule installed by the firewall controller 320 may allow the transmission of packets between application A and application B in either direction such that the syn-ack packet is transmitted back to application A. The acknowledgement message to establish the communication session between the applications may traverse the same communication path and arrive at application B to establish the communication session between the applications. Each packet shared between the applications may be considered by firewall A 312 and firewall B 318 based on the application identifier rule.

Cloud computing environments, such as network A 302 and network B 304, provide several features or advantages of the virtualized nature of the computing environments. For example, applications may be scaled in response to demand or network constraints by deploying new instances of the application in the same or other cloud environment. Referring to FIG. 5, application A may be deployed on server C 310 in response to a high demand for application A by users of the cloud environment. The deployment of application A to server C 310 may occur automatically through the measurement of a threshold number of requests for application A received at the network 302. Application A may register with the firewall controller 320 in a similar manner as described above to obtain a token associated with the application and the IP address of server C. This token may be stored in the application map and provided to the application A instance of server C 310, firewall A 312, firewall B 318, or any other component of the system 500. An updated application map may also be provided to firewall A 312 and/or firewall B 318 that includes the token for the application A instance of server C 310. The application A instance on server C 310 may use the established rule to communicate with application B.

Application A of server C 310 may attempt to communicate with application B of server D 314 of network B 304 during the execution of operations of the application. For example, application A of server C 310 may be an instance of a web server that uses a database of application B of server D 314 to store data during the execution of the web server application. To communicate with application B, application A of server C 310 may send, at 572, an initial packet to firewall A 312. As application A is establishing a communication session with application B, this packet may be a tcp-syn packet, as described above. Firewall A 312 may check the stored ruleset for the device to determine if a transmission rule is stored for communications between application A and application B. As this rule was previously stored through the methods described above in reference to application A of server A 306, firewall A 312 may verify the token of the packet from application A of server C 310 (based on the source IP address provided in the packet) and, if verified, transmit the packet to firewall B 318. Firewall A 312 may also provide the application identifier, source IP address, and token to the firewall controller 320 to verify the token of the packet. The verification of the token may occur for the initial handshake messages between the applications or may occur for each packet received at the firewall 312. Regardless of which device verifies the token, an update to the ruleset of firewall A 312 is not needed as the rule based on the application identifiers has already been stored at the firewall from the previous instance of the application A in the network 302. Through the application identifier-based rules, however, updates to the firewall rulesets may be reduced or eliminated as new application instances are deployed in the network 302.

The application identifier-based rules for the firewalls 312, 318 of the environment 500 may also aid in providing a failover feature for the cloud environments. For example, server D 314 hosting an instance of application B may, due to a technical issue, fail and a failover to a backup server procedure may begin. The failover procedure may include the network B 304 deploying a new instance of application B in a backup server, such as server E 316. Packets intended for application B may be temporarily halted by the system 500 until the failover application B is instantiated. Updating the rulesets of firewall A 312 and firewall B 318 with new rules identifying the destination IP address of backup server E 316 may be skipped as the rules are based on the application identifiers of source application A and destination application B. The system 500 or networks 302, 304 do not need to wait for the rulesets of the firewalls 312, 318 to be updated. Rather, the packets intended for application B may be transmitted, at 570, to server E 316 without an update to the firewall rulesets.

The deployment of application B to sever E 316 may follow a similar procedure as above in which the application B instance registers with firewall controller 320 to obtain a token associated with the IP address of failover server E 316. The token of application B of server E 316 may be used to transmit communications back to application A of network A 302.

Figure 6:
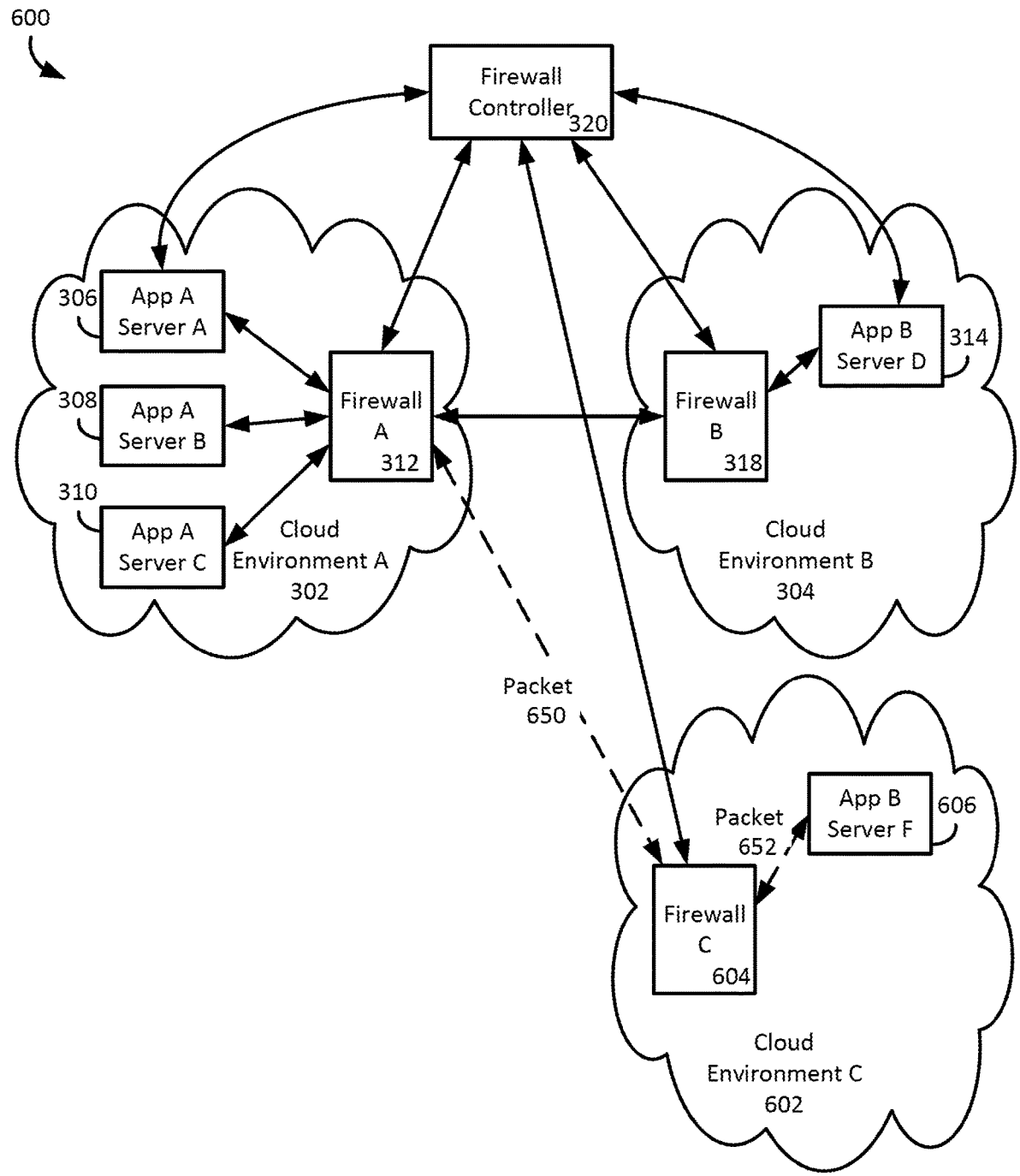
FIG. 6 shows an example method for using application identifier rules in a firewall device for a failover procedure to a separate cloud computing environment.

The scaling, failover, and load balancing features provided by the networks 302, 304 may also extend to the use of additional cloud environments. For example, FIG. 6 shows an example method for using application identifier rules in a firewall device 604 for a failover procedure to a separate cloud computing environment 602. In the example shown, a failover server (server F 606) for application B is in a cloud computing environment C 602, separate from cloud network A 302 and network B 304. Cloud environment C 602 may be reserved for failover operations of the system 600 or may be available for any cloud computing functions. The failover procedure for application B from server D 314 to server F 606 may occur as described above in response to a failure of some type at server D. In this example, server F 606 of cloud environment C 602 may operate as the failover server for application B.

Firewall C 604 of cloud environment C 602 may be in communication with the firewall controller 320 in a similar manner as firewall A 312 and firewall B 318 discussed above. Firewall C 604 may thus receive verified application identifier rules in the ruleset stored by firewall C for processing communication packets based on application identifiers of a source application and a destination application. Following the example above, firewall C 604 may receive the verified rule for application A to communicate with application B when firewall A 312 checks for such a rule. Firewall A 312 may transmit, at 650, communication packets from application A to firewall C 604 to reach application B of the failover server F 606 when failover application B is instantiated at server F. Firewall C 604 may also have previously received the application identifier rule for allowing communications from application A to application B when the rule was installed above (steps 560 and 562). As mentioned, firewall controller 320 may install the verified rule in some or all of the firewalls in communication with the controller, such as firewall C 604, in addition to firewall A 312 and firewall B 318. As the ruleset for firewall C 604 thus includes the rule for communication between application A and application B, firewall C may allow the packet to be sent, at 652, to server F 606. Firewall C 604 may transmit the packet to application B based on the application identifiers of the source application and the destination application based on the application identifier rule received from the firewall controller 320. Changes in the transmission path for packets within or between cloud environments may be transmitted by firewall devices awaiting updates to the ruleset as applications are deployed on different devices or network locations of the cloud environments. Rather, the rulesets for the firewalls may use application identifier-based rules that are network location agnostic, resulting in fewer updates to the rulesets for the firewalls and faster transition to alternate transmission paths.

Figure 7:
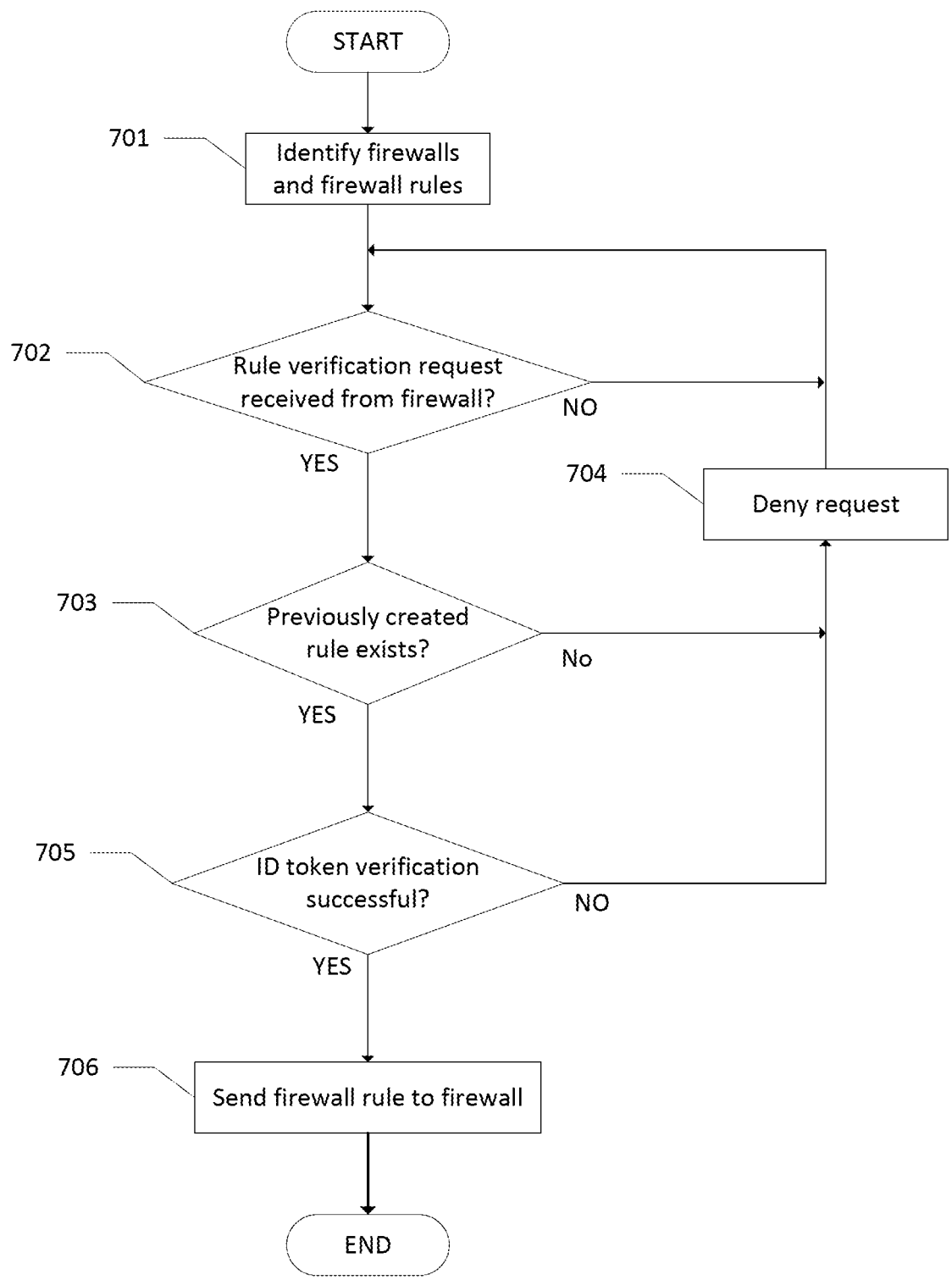
FIG. 7 shows an example method performed by a firewall controller for providing a firewall rule to a firewall.
Figure 8:
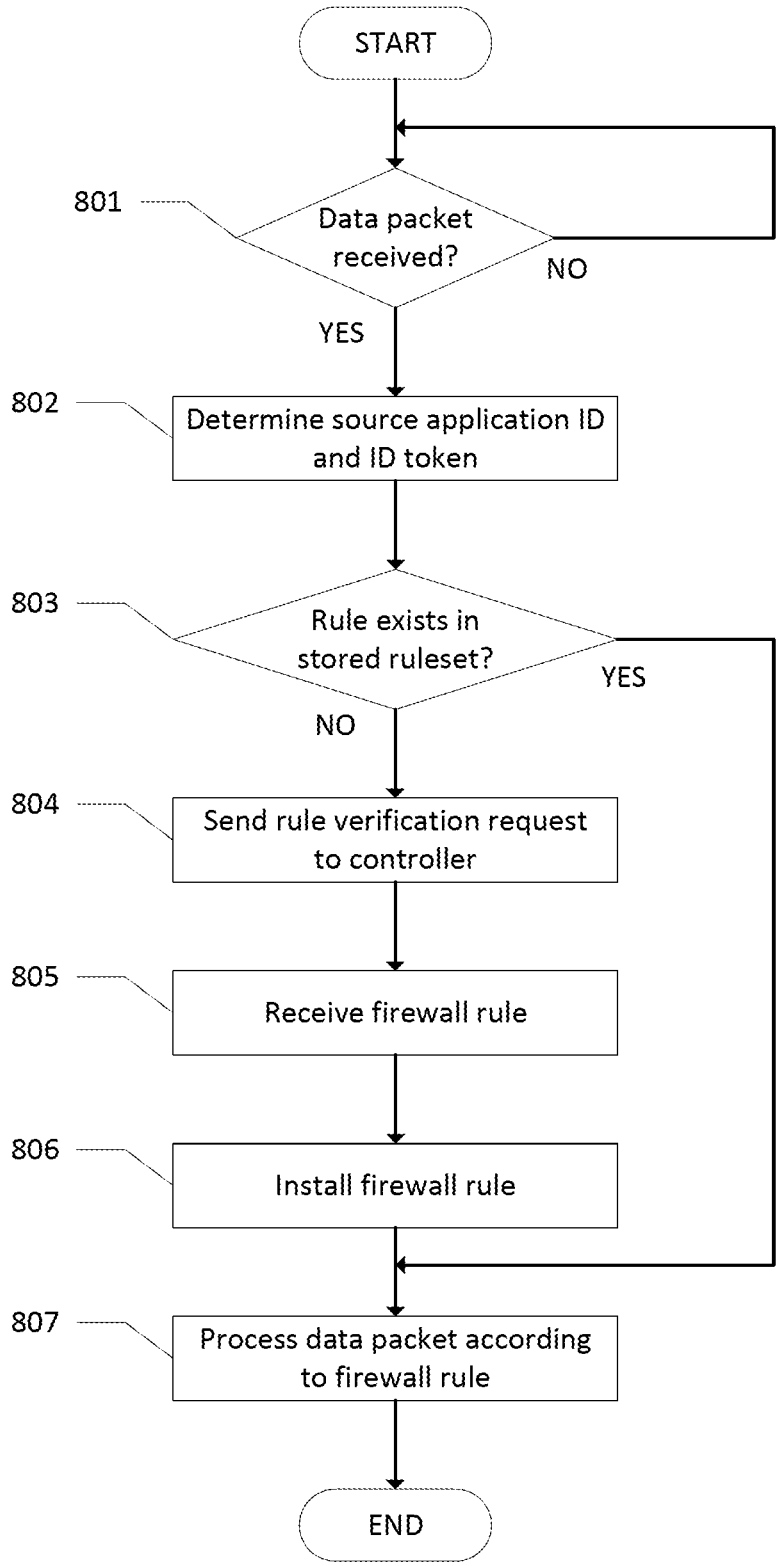
FIG. 8 shows an example method performed by a firewall for processing a data packet.

Having disclosed some basic system components and concepts, FIGS. 7-8 illustrate methods that may be performed to implement various features described herein. The methods described herein may be performed by various devices illustrated in FIGS. 1 through 6, such as the firewall controller 320, the firewall A 312, the firewall B 318, the firewall C 604, etc. The steps outlined herein are exemplary and may be implemented in any combination thereof, including combinations that exclude, add, or modify certain steps.

FIG. 7 shows an example method performed by a firewall controller for providing a firewall rule to a firewall. At step 701, a firewall controller 320 may identify firewalls and firewall rules, Specifically, the firewall controller 320 may identify all firewalls (e.g., firewall devices, firewall services, etc.) that the firewall controller has under control or is associated with. This may be performed as part of the installation or setup process for the firewall controller. For example, the firewall controller 320 may receive announcement messages from the various firewalls. For example, in FIG. 6, the firewall controller 320 may identify firewall A 312, firewall B 318, and firewall C 604 as being under control of the firewall controller 320. The information about these firewalls may be stored in the firewall controller such that it may be used later to determine which firewalls should receive firewall rules. The firewall controller 320 may identify firewall rules. The firewall controller 320 may identify any previously implemented firewall rules or create new firewall rules based on rule implementation requests from applications. As described above with reference to steps 456, 458 of FIG. 4, an application may request permission for one or more firewall rules to be implemented. The rule implementation request may comprise a source application identifier and/or a destination application identifier. The firewall controller 320 may allow or deny the rule implementation request by sending a result notification to the application. After a rule implementation request is allowed, the firewall controller 320 may establish a new firewall rule and store it in the firewall controller 320.

At step 702, the firewall controller 320 may determine whether a rule verification request has been received from any of the firewalls. The rule verification request may be for determining whether a rule is to be included in the ruleset of the firewall 312 and/or other firewalls. The rule verification request may comprise a data packet received by the firewall that sent the rule verification request or only a portion of the data packet. The rule verification request may comprise a source application identifier corresponding to a source application and a destination application identifier corresponding to a destination application. In addition, the rule verification request may also comprise a token (e.g., identification token) and/or a source IP address. If no rule verification request has been received yet, the controller 320 may continue to monitor for any incoming rule verification requests and/or identify any additional firewalls.

If the rule verification request is received from a firewall, e.g., the firewall 312 of FIG. 5, at step 703, the firewall controller 320 may determine whether a previously created rule exists within the firewall controller 320. A rule may comprise an action (e.g., allow, deny, etc.) to perform on a data packet based on the source application ID and/or the destination application ID for that data packet. In other words, the firewall controller 320 may determine whether a rule has been established for communications originating from the source application (e.g., application A), as identified by the provided source application identifier, and destined for the destination application (e.g., application B), as identified by the provided destination application identifier. The rule may comprise an action to perform on transmission of data packets, such as allowing transmission of the packet, denying transmission of the packet, directing the packet to a honeypot device, etc. A honeypot device may comprise a dedicated computing device configured to deliberately collect illicit or suspicious packets for the purpose of analyzing and counteracting potential security threats. If a rule that corresponds to the rule verification request from the firewall 312 does not exist within the firewall controller 320, then at step 704, the firewall controller 320 may deny the request, for example, by sending a request deny message to the firewall 312, and the process may return to step 702. After receiving the request deny message, the firewall 312 may proceed without including the requested rule in its ruleset.

However, if such a rule does exist, then the firewall controller 320 may verify the token associated with the source application indicated by the source application identifier at step 705. For example, the firewall controller 320 may retrieve a stored token, previously calculated based on the source IP address and/or the source application identifier and stored in the application map of the firewall controller 320, and compare the stored token with the received token provided in the rule verification request. The firewall controller 320 may also use the source IP address to generate a hash value and compare the generated hash value to the received token to determine if they are the same. Verification succeeds if a match is found. Thus, the token provides a layer of protection to ensure that the rule verification request comes from a known source. The firewall controller 320 may also determine an expiration status of the token by comparing a time stamp associated with the token to a current time. If the token verification is not successful, either through hash mismatch or token expiration, then the rule verification request may be discarded and the process may go to step 704.

If the token verification is successful, the process may continue to step 706, where the firewall controller 320 may send the firewall rule to the firewall 312. The firewall controller 320 may also send the firewall rule to other firewalls. These other firewalls may be all firewalls that are registered with the firewall controller 320, or they may be assigned to a destination application identified by the destination application identifier. Any firewalls that received the firewall rule may execute the rule to process relevant data packets.

FIG. 8 shows an example method performed by a firewall (e.g., firewall device, firewall service, etc.) for processing a data packet. At step 801, the firewall 312 may determine whether a data packet has been received. If no data packet has been received yet, the firewall 312 may continue to monitor for any incoming data packets. If the data packet is received, then at step 802, the firewall 312 may determine, from the data packet, a source application identifier associated with the source application, and a token associated with the sending device (e.g., source device of the data packet). The data packet may be sent by a source application running on a server (e.g., a source device). The firewall 312 may also determine, from the data packet, a destination application identifier associated with a destination application for which the data packet is destined. The source application identifier and the destination application identifier may have been previously assigned by the firewall controller 320 to the source application and the destination application, respectively, as illustrated in steps 450, 454 of FIG. 4. For example, an application may send a unique value (e.g., UUID) to the firewall controller 320 to request an application identifier. The data packet may additionally comprise a source IP address, a destination IP address, a source port number, a destination port number, etc.

At step 803, the firewall 312 may determine whether a rule exists within the stored rules of the firewall 312. The rule may provide an action (e.g., allow, deny, apply class-of-service marking, apply encryption, mirror packet, etc.) to perform on data packets that are associated with the source application identifier and/or the destination application identifier. If such a rule already exists, then the process may proceed to step 807 and process the data packet according to the stored firewall rule.

At step 804, if the rule does not already exist, then the firewall 312 may send a rule verification request to a firewall controller 320. The rule verification request may comprise whole or part of the data packet. Specifically, the rule verification request may comprise the source application identifier, the destination application identifier, and/or the identification token.

At step 805, the firewall 312 may receive, from the firewall controller 320, a firewall rule for processing the data packet. The firewall rule may comprise a processing action for processing the data packet, and a condition for executing the processing action. The condition may comprise the source application identifier and/or the destination application identifier.

The firewall 312 may install the received firewall rule at step 806, and process the data packet according to the firewall rule at step 807. For example, the firewall 312 may send, based on the firewall rule, the data packet to a destination application. The firewall 312 may, based on the firewall rule, send the data packet to another firewall associated with a destination application indicated by the destination application identifier. Processing the data packet may comprise discarding the data packet based on the firewall rule.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a computing device and from a first firewall service, a data packet comprising a source application identifier and a destination application identifier;
verifying that the data packet originates from a source application indicated by the source application identifier;
after verifying that the data packet originates from the source application, determining a firewall rule for processing the data packet;
configuring the first firewall service to execute the firewall rule to process the data packet from the source application based on the source application identifier; and
sending, by the computing device, the firewall rule to a second firewall service that is associated with a destination application identified by the destination application identifier.

2. The method of claim 1, wherein processing the data packet comprises sending, based on the firewall rule and via the first firewall service, the data packet.

3. The method of claim 1, wherein verifying that the data packet originates from the source application comprises:
generating a hash value from a network location identifier associated with a source device.

4. The method of claim 1, wherein the data packet further comprises an identification token associated with a source device of the data packet, and
wherein verifying that the data packet originates from the source application comprises:
comparing the identification token to a stored identification token associated with the source application identifier.

5. The method of claim 1, wherein the data packet further comprises an identification token associated with a source device of the data packet, and
wherein the method further comprises:
determining, by the computing device, an expiration status of the identification token by comparing a time stamp associated with the identification token to a current time.

6. The method of claim 1, further comprising:
receiving, by the computing device, a request for the source application identifier, the request comprising a universally unique identifier (UUID) associated with the source application; and
generating, based on the UUID, the source application identifier.

7. The method of claim 1, further comprising:
receiving, by the computing device, a request for an identification token, the request comprising a network location identifier of a source device of the data packet;
generating a hash value from the network location identifier;
setting the hash value as the identification token; and
sending the identification token to the source application.

8. The method of claim 1, wherein the data packet further comprises:
a destination identification token associated with a destination device of the data packet, and
wherein the method further comprises:
verifying, based on the destination identification token, that the data packet is destined for the destination application.

9. A method comprising:
receiving, from a sending device, a data packet;
determining, from the data packet:
a source application identifier associated with a source application, and
a destination application identifier associated with a destination application;
sending the source application identifier and the destination application identifier to a firewall controller;
receiving, from the firewall controller, a firewall rule for processing the data packet, wherein the firewall rule comprises:
a processing action for processing the data packet, and
a condition for executing the processing action, wherein the condition comprises the source application identifier and the destination application identifier; and
sending, via a firewall service and based on the firewall rule, the data packet to the destination application.

10. The method of claim 9, wherein the data packet further comprises:
the destination application identifier associated with the destination application, and
an identification token associated with the sending device.

11. The method of claim 9, wherein the source application is a virtualized application at least partially deployed on the sending device.

12. The method of claim 9,
wherein the method further comprises:
receiving, from a second sending device, a second data packet comprising the source application identifier and the destination application identifier; and
sending, via the firewall service and based on the firewall rule, the second data packet to the destination application.

13. A method comprising:
receiving, by a firewall controller and from a first firewall service, a source application identifier and a destination application identifier;
determining a firewall rule for processing a data packet based on the source application identifier and the destination application identifier; and
sending the firewall rule to a plurality of firewall services, wherein the plurality of firewall services comprise the first firewall service.

14. The method of claim 13, further comprising:
receiving, by the firewall controller and from the first firewall service, an identification token; and
verifying that the identification token is associated with a source application indicated by the source application identifier.

15. The method of claim 14, wherein verifying that the identification token is associated with the source application comprises:
generating a hash value based on a network location identifier associated with a source device, which originated the source application identifier and the destination application identifier.

16. The method of claim 14, wherein verifying that the identification token is associated with the source application comprises:
comparing the identification token to a stored identification token associated with the source application identifier.

17. The method of claim 13, wherein the plurality of firewall services comprise a second firewall service associated with a second application indicated by the destination application identifier.

18. The method of claim 13, wherein processing the data packet comprises discarding, based on at least one of the source application identifier or the destination application identifier, the data packet.

19. The method of claim 13, further comprising:
   receiving, by the firewall controller and from the first firewall service, an identification token; and
   determining an expiration status of the identification token by comparing a time stamp associated with the identification token to a current time.

\* \* \* \* \*